June 19, 1956  E. BERG  2,750,770
ANTI-DRIP DEVICE FOR COFFEE CUPS AND THE LIKE
Filed Nov. 2, 1953
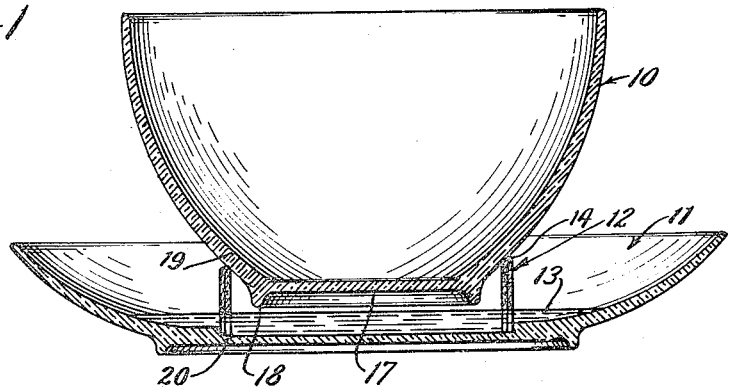
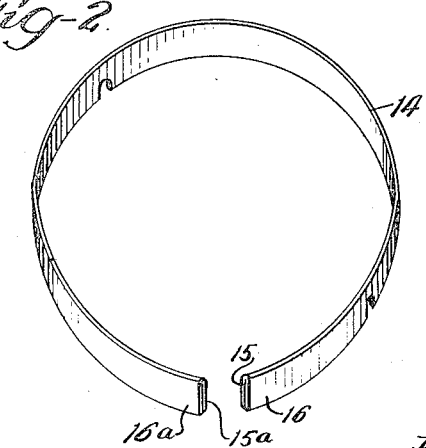
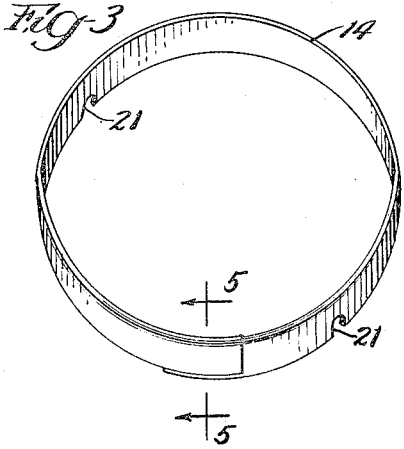
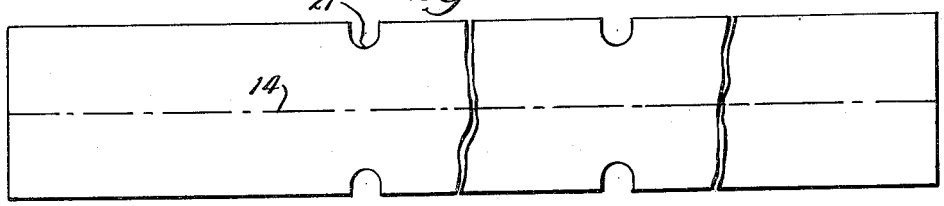
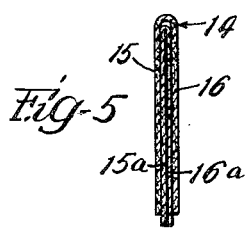
INVENTOR.
Elaine Berg
BY
Robert H. Wendt
Atty.

United States Patent Office 2,750,770
Patented June 19, 1956

2,750,770

ANTI-DRIP DEVICE FOR COFFEE CUPS AND THE LIKE

Elaine Berg, Chicago, Ill., assignor of one-third to Robert H. Wendt, Evanston, Ill., and one-third to Faith P. Peters, Chicago, Ill.

Application November 2, 1953, Serial No. 389,701

2 Claims. (Cl. 65—65)

The present invention relates to anti-drip devices for coffee cups and the like, and is particularly concerned with the provision of an improved device for supporting a cup in a saucer in such manner that spillage or drip is drained away from the cup, and the cup is maintained in a dry condition.

One of the objects of the invention is the provision of an improved anti-drip device for cups and the like which supports the cup in spaced relation to the bottom of the saucer in a firm and stable manner so that the drip may run down into the saucer; and the cup may be kept out of contact with any spillage or drip.

Another object of the invention is the provision of a device of the class described which is so constructed that they may be stacked and so that cups and saucers full of coffee or the like may be stacked and carried with the anti-drip devices in the assembly.

Another object of the invention is the provision of an improved device of the class described which is simple, capable of economical manufacture, attractive in appearance, and which does not detract in any way from the appearance of the cup and saucer assembly, appearing to be practically invisible.

Another object of the invention is the provision of an anti-drip device of the simplest type, which is adjustable in size to large and small cups, and which may be shipped or stored in a flat condition so that it is easily transported and stored in a minimum amount of space.

Other objects and advantages of the invention will be apparent from the following description and the accompanying drawings, in which similar characters of reference indicate similar parts throughout the several views.

Referring to the single sheet of drawings accompanying this specification,

Fig. 1 is a vertical sectional view taken on a plane passing through the axis of a cup and saucer and through the present anti-drip device;

Fig. 2 is a view in perspective of the anti-drip device in open position;

Fig. 3 is a similar view of the anti-drip device with its ends closed and adjusted to a certain cup;

Fig. 4 is a plan view of the pattern for the anti-drip device, showing how the device appears when in a flat condition for storage or transport;

Fig. 5 is a sectional view, taken on the plane of the line 5—5 of Fig. 3, looking in the direction of the arrows.

Referring to Fig. 1, this view shows in cross section a coffee cup 10 and a saucer 11 equipped with an anti-drip device 12 embodying the invention and holding the cup in spaced relation to the drip and spillage 13 in the saucer 11.

The present anti-drip device is preferably made out of a rectangular strip of relatively stiff, yet bendable, cardboard or sheet plastic; and if plastic, it may be transparent. The strip is creased or bent sharply along a medial line 14 (Fig. 4), producing a hairpin bend, which is also indicated at 14 in the various views.

This bend places the depending flanges 15 and 16 relatively close to each other; and the closeness of the two flanges is accentuated by the bending of the bent strip into cylindrical form, as shown in Fig. 2. As the inner flange 15 is at one radius and the outer flange 16 is at a larger radius, and these flanges are initially of the same length, the bent strip can only be formed into a cylinder or circle by compressing the inner flange 15 and stretching the outer flange 16.

These two flanges being secured together at the U bend 14, the outer flange 16 is stretched around the inner flange 15 quite tightly, narrowing any crack between them and stiffening the entire structure.

At the ends of the strip it is possible, however, to spread the two flanges 15 and 16 from each other; and I have indicated the same flanges on the opposite end of the strip with the numbers 15a and 16a. The two ends are joined together by spreading the flanges 15, 16 slightly and inserting the other end of the strip with its flanges 15a and 16a between the flanges 15 and 16, where they are compressed and held frictionally in any adjusted position, especially when the two ends are located with the inner one pushed up tightly into the outer one.

It is thus possible to adjust the anti-drip device to the size of any cup.

The size of the ring is preferably larger than the diameter of the usual depression 17 and the usual supporting rib 18 on the bottom of any cup so that the ring engages the cup along a circle at the point 19. The width of the ring is sufficient so that it will hold the cup with its lower supporting rim 18 above any drippage 13.

Although the drippage may flow through the crack at 20 between the ring and the saucer to facilitate the equal distribution of drippage inside and outside the ring, the ring is preferably provided with a plurality of edge slots or grooves 21 for flow of drippage.

The present devices are preferably provided with preformed creases at 14; but they may be stacked, stored, and shipped in a flat condition, thus occupying a minimum amount of space.

It will thus be observed that I have invented an improved anti-drip device which is of the simplest type, yet it is adjustable in size to any cup; and it requires no special fastening devices for securing its adjustment.

The present anti-drip device is adapted to hold the cup in spaced relation to the bottom of the saucer out of contact with drippage and spillage. Thus the bottom of the cup is maintained substantially dry; and the drip, not being carried by the cup, it does not fall upon the table cloth or clothing of the user. When the device is made of transparent material, it is substantially invisible in the assembly; and it is also sanitary, which enables the user to pour any drippage back into the cup.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. An anti-drip device for coffee cups and the like, comprising a strip of bendable, relatively stiff sheet material of rectangular shape formed with a crease extending longitudinally of its longest dimension parallel to both lateral edges, and causing the parts of said strip to be located in substantially U shape, engaging each other, the said folded strip being curved into substantially cylindrical form, which causes its two folded parts to be drawn tightly against each other, one end of the strip being inserted into the U shaped recess in the other end of the strip, and the diameter of the annulus thus formed being of sufficient size to engage the lower side wall of a coffee cup or the like outside of and above the cup supporting rim on the bottom of the cup, the width of the annulus being sufficient to support said rim above the bottom of a saucer or other receptacle within which the annulus and cup are located.

2. An anti-drip device for coffee cups and the like, comprising a strip of bendable, relatively stiff sheet material of rectangular shape formed with a crease extending longitudinally of its longest dimension parallel to both lateral edges, and causing the parts of said strip to be located in substantially U shape, engaging each other, the said folded strip being curved into substantially cylindrical form, which causes its two folded parts to be drawn tightly against each other, one end of the strip being inserted into the U shaped recess in the other end of the strip, and the diameter of the annulus thus formed being of sufficient size to engage the lower side wall of a coffee cup or the like outside of and above the cup supporting rim on the bottom of the cup, the width of the annulus being sufficient to support said rim above the bottom of a saucer or other receptacle within which the annulus and cup are located, the said annulus being provided with a plurality of downwardly open grooves in its lower edge to permit drippage to drain into the space inside the annulus below the cup.

References Cited in the file of this patent

UNITED STATES PATENTS

| | | |
|---|---|---|
| 503,508 | Walter | Aug. 15, 1893 |
| 942,126 | Backlund | Dec. 7, 1909 |
| 1,229,226 | Cary | June 12, 1917 |
| 1,657,664 | Dexter | Jan. 31, 1928 |
| 1,937,939 | Behrens | Dec. 5, 1933 |
| 2,059,769 | Bell | Nov. 3, 1936 |
| 2,117,266 | Adams | May 17, 1938 |
| 2,396,329 | Lippmann | Mar. 12, 1946 |
| 2,657,559 | Berg | Nov. 3, 1953 |

FOREIGN PATENTS

| | | |
|---|---|---|
| 720,065 | France | Nov. 24, 1931 |
| 415,878 | Great Britain | Sept. 6, 1934 |